United States Patent [19]

Deffeyes et al.

[11] Patent Number: 4,937,995

[45] Date of Patent: Jul. 3, 1990

[54] NONINVASIVELY IDENTIFIABLE MEMBRANE ROOF SYSTEM

[75] Inventors: Robert J. Deffeyes, Cincinnati, Ohio; William A. Manly, Arlington, Tex.

[73] Assignee: Carlisle Corporation, Cincinnati, Ohio

[21] Appl. No.: 207,709

[22] Filed: Jun. 16, 1988

[51] Int. Cl.⁵ ............................................... B27K 1/00
[52] U.S. Cl. ...................................... 52/515; 52/748; 156/272.4; 148/105
[58] Field of Search ......................... 52/1, 3, 515–517, 52/748, 659, 540; 156/272.4; 283/82; 148/105

[56] References Cited

U.S. PATENT DOCUMENTS

| | | | |
|---|---|---|---|
| 1,083,243 | 12/1913 | Edwards | 52/540 |
| 1,447,265 | 3/1923 | Purdy | 428/172 |
| 1,480,023 | 1/1924 | Speer | 428/280 |
| 3,494,727 | 2/1970 | Rapaport | 52/517 |
| 3,657,038 | 4/1972 | Lightfoot | 156/272.4 |
| 3,746,606 | 7/1973 | Chao | 283/82 |
| 3,848,384 | 11/1974 | Eaton et al. | 52/540 |
| 4,075,384 | 2/1978 | Suzuki et al. | 427/127 |
| 4,295,445 | 10/1981 | Kopenhaver | 118/206 |
| 4,423,415 | 12/1983 | Goldman | 283/82 |
| 4,442,152 | 4/1984 | Kirk | 428/77 |
| 4,568,921 | 2/1986 | Pokalsky | 340/572 |
| 4,806,740 | 2/1989 | Gold et al. | 283/82 |

Primary Examiner—James L. Ridgill, Jr.
Attorney, Agent, or Firm—Wood, Herron & Evans

[57] ABSTRACT

To indicate the origin of manufacture of the components of a roofing system, magnetically permeable particles are incorporated into the components. The particles are preferably loaded into the lap sealant and adhesive used to form field splices. Thus loaded, the lap sealant and/or adhesive has magnetically permeable properties or characteristics which are electromagnetically detectable through and beyond one layer of rubber sheeting. Detection of these particles provides an indication of origin of the material.

17 Claims, 1 Drawing Sheet

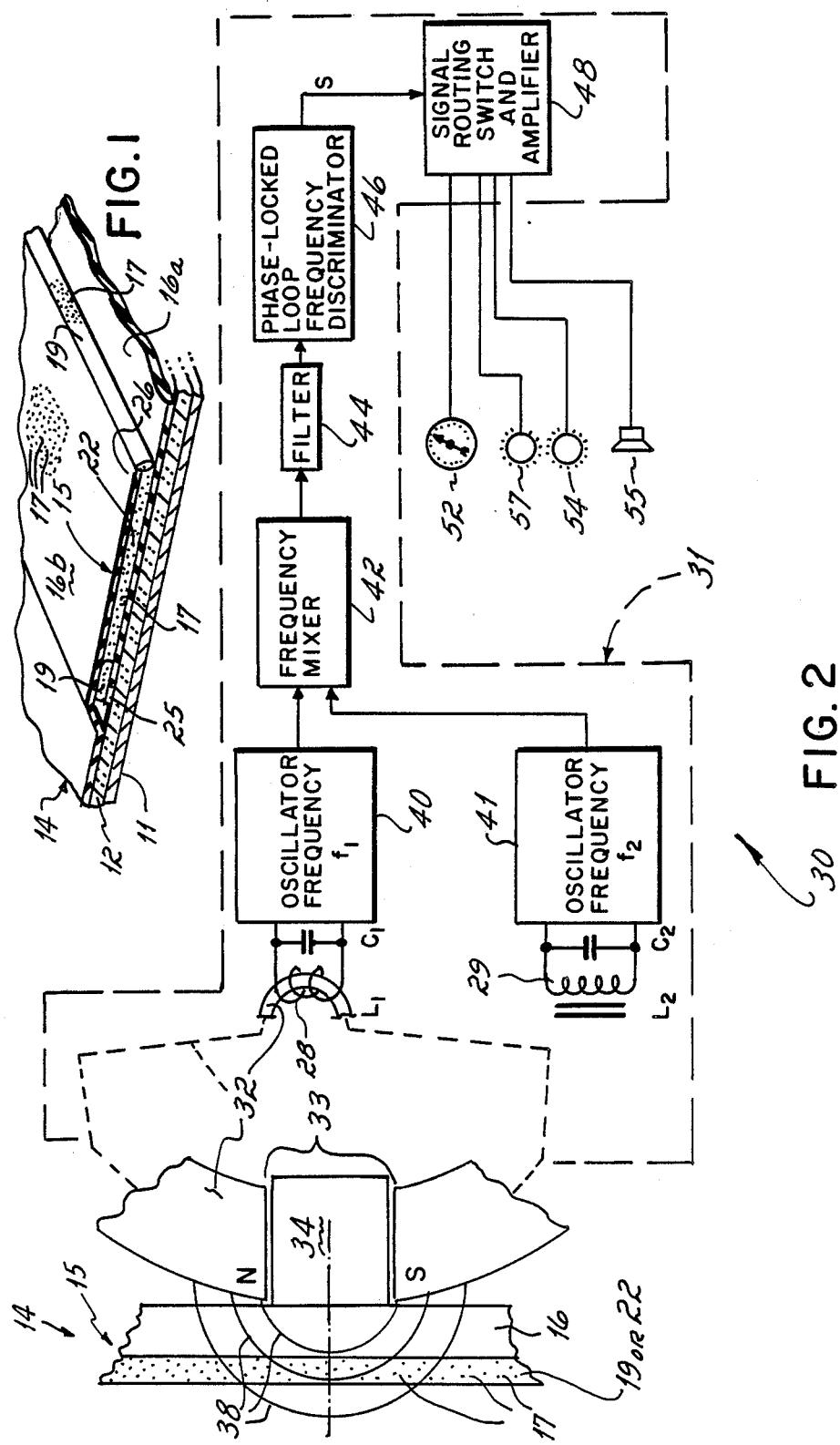

NONINVASIVELY IDENTIFIABLE MEMBRANE ROOF SYSTEM

FIELD OF THE INVENTION

The present invention relates to a water impermeable roof system. More particularly, the present invention relates to a water impermeable roofing system in which the origins of manufacture of the component parts, namely, the lap sealant, the adhesive and the overlapped membrane sheets, are noninvasively identifiable.

BACKGROUND OF THE INVENTION

To form a membrane roof system, separate membrane sheets of rubber must generally be overlapped and spliced together to form one continuous water impervious membrane. Membrane sheets can be manufactured up to several hundred feet in length, but are limited to about fifty feet in width. To cover the entire surface area of a roof deck that is more than fifty feet wide, the overlapped membrane sheets must be adhered along numerous water impermeable seams by forming field splices.

A field splice is formed by bonding together overlapping edges of adjacent membrane sheets, i.e., the lower surface of an edge of a first membrane sheet is bonded to the upper surface of an edge of a second membrane sheet. The field splice, which is about three to twelve inches wide, generally includes a thin layer of an internal splicing adhesive or cement which provides a strong secure bond between the two sheets. The field splice also includes a bead of lap sealant either between the overlapped edges of the field splice or at the exposed edge of the splice.

The membrane is held to the roof deck in one of several ways. For example, the roof system can be secured over its entirety with adhesive. Alternately, the roof system can be secured solely with ballast. Another approach employs mechanical fasteners.

Generally, roofing systems of this type last about fifteen years. Because manufacturers often sell roofing systems or various roofing products with a guarantee as to their durability, it is desirable that the manufacturer or dealer have some method for readily identifying the manufacturer of the component roofing parts.

Purdy, U.S. Pat. No. 1,447,265, entitled Means of Identifying Prepared Roofing, discloses the incorporation of a red thread into prepared roofing products in order to provide a permanent means of identification.

Speer, U.S. Pat. No. 1,480,023 entitled Composition Roofing, discloses asphalt roofing material having designs or marks cut into the underside thereof at regularly spaced intervals to provide identifying data such as trademarks or the like.

Although these methods of identifying the origin of manufacture of certain roofing material may be effective in identifying the separate sheets of various roofing systems over a period of time, they have not proved helpful in identifying the origin of the adhesive or lap sealant used along the overlapped seams.

When a failure occurs along a seam, it is imperative to determine the origin of manufacture of the adhesive or lap sealant that was originally used. Substances of this type are generally kept in tubes or containers which are readily identifiable prior to use. However, after application there is no good way of determining from which container the substances were taken, especially years after application.

Chemical analysis of the sealant or adhesive after application requires destruction of the roof. This poses a dilemma for the membrane roofing manufacturer who guarantees a roof system formed of component materials that are installed by an independent contractor. There is no simple way of determining, with any degree of certainty, whose lap sealants or adhesives were used when the roof system was installed.

Identifying articles with ferromagnetic properties has been used for various applications. Pokalsky, U.S. Pat. No. 4,568,921 discloses special responder targets having a high magnetic permeability and being affixed to various items of merchandise so as to be detectable by monitoring the magnetic fields produced by the responder targets on protected articles when the articles are carried through a zone in which an alternating magnetic field is generated.

Kirk U.S. Pat. No. 4,442,152 discloses a marker tape for marking the positions of structural members behind wall panels. The tape is attached to one side of a structural member, such as wall studs, so that the location of the member can be determined after it is covered by a wall, ceiling or floor panel. No such systems has ever been applied to roofing materials or components thereof.

SUMMARY OF THE INVENTION

It is an object of this invention to provide a roof system in which the origin of manufacture of the component materials may be readily and accurately identified.

It is also an object of this invention to provide a noninvasive method for identifying the origin of manufacture of thermoset plastics, particularly those thermoset plastics used as component materials in forming a roof system, namely, adhesives and lap sealants.

The present invention provides a roof system having magnetically permeable material or particles incorporated therein in sufficient quantity and distribution to impart electromagnetically detectable properties thereto. Preferably, a quantity of magnetically permeable particles representing approximately 5% by weight of the total weight of non-volatile solids is loaded and mixed into the lap sealant and/or adhesive to achieve a suspended homogenous dispersion. Thus loaded, the lap sealant and/or adhesive can be detected in a noninvasive manner even when covered by an overlying membrane sheet.

Further in accordance with the principles of the present invention, magnetically permeable particles may be incorporated into the membrane sheets or painted onto the sheets in solvent form in regularly spaced intervals or designs to allow identification of the membrane sheets. Moreover, by loading the different roofing components with varying densities of magnetically permeable particles, separate components can be noninvasively distinguished, and the physical make-up of the entire roofing system can be determined.

Thus, any of the component parts of a roof system are noninvasively identifiable by incorporating magnetically permeable particles therein and then directing an electro-magnetic field proximate the components of the roof system to detect any change in magnetic flux caused by the magnetic particles.

The present invention can be further appreciated in light of the following detailed description and drawings in which:

BRIEF DESCRIPTION OF THE DRAWINGS

FIG. 1 is an isometric cross-sectional view of a roofing system partially broken away;

FIG. 2 is a block diagram of the incremental inductance meter used for noninvasive identification of the roofing system of this invention, including an enlarged view of a portion of the incremental inductance meter residing proximate the roofing system.

DETAILED DESCRIPTION OF THE DRAWINGS

A roof structure generally includes a deck surface 11, a layer of thermal insulation 12 and a membrane 14 covering the deck.

Membrane 14 is formed from a plurality of membrane sheets 16 which are field spliced to form one continuous water impervious membrane 14 covering the entire roof deck 11. FIG. 1 shows two sheets 16 joined by a field splice 15. The sheets 16 are generally formed from an ethylene propylene diene monomer rubber ranging in thickness from 0.045" to 0.065". However, many other polymers may be used to make the membrane sheeting.

The field splice 15 includes a two element bonding system. The first element is a thick internal bead of lap sealant 19. The second element is a wide thin layer of splicing cement 22. The splicing cement, or adhesive, resides between a lower surface of sheet 16b and an upper surface of sheet 16a. The lap sealant 19 as shown lies on an innermost portion 25 of sheet 16a. A bead of lap sealant 19 also resides along an exposed edge of or outermost portion 26 of sheet 16b.

The lap sealant 19 must have a thickness effective to bridge minor gaps typically encountered in field splices. For this purpose, it should be generally about 1/16 to ⅛ of an inch in diameter as applied and preferably 1/16 to ¼ inch. When compressed, it will increase in horizontal width but decrease in vertical thickness.

The lap sealant can be formed from a variety of different curing and non-curing compositions such as EPDM based caulking compounds, butyl based caulking compounds and silicone caulking compounds such as those purchased from Dow Corning and sold under the brand name Dow Corning 799.

The sealant, splicing cement and membrane must be compatible to form a strong adhesive bond. If they are incompatible, the sealant could separate from the cement and the sealant would fail or the sealant could separate from a non-cemented surface and then the sealant could fail.

The splicing cement will generally cover an area of the seam having a horizontal width (cross-section) of 3-6 inches and preferably 4 inches. The vertical thickness of the layer of cement generally is from about 8-20 mils, preferably about 10 mils for normal roofing purposes. The splicing cement should be a cement which is insensitive to moisture. Suitable water insensitive adhesives are butyl based adhesives such as are described in U.S. Pat. No. 4,501,842. The disclosure of this patent is incorporated herein by reference. A commercially available butyl based adhesive is Uniroyal M6365. Splicing tapes may also be used for this purpose.

Methods of sealing the overlapping edges to form the one continuous membrane 14 are disclosed and described in pending patent application Ser. No. 018,452, filed on Feb. 25, 1987, the disclosure of which is incorporated herein by reference.

Magnetically permeable particles are incorporated into or onto at least one of the components of the roof system, i.e., the membrane, the sealant and/or the adhesive including any adhesive which may be used to hold the membrane to the roof deck.

For the purposes of this invention, the phrase magnetically permeable particles 17 refers to material or particles exhibiting strong ferromagnetic properties, which are indicated by a relative magnetic permeability that is much greater than one and preferably on the order of $10^3$. Basically, a material having a relative magnetic permeability greater than one will positively influence a magnetic field passing therethrough, whereas a material exhibiting a magnetic permeability less than one will inhibit magnetic flux. Soft ferrite powders such as nickel zinc ferrite, exhibit high magnetic permeability and have proved successful for the purposes of this invention. However, particles of virtually any magnetically permeable material will suffice, provided that such particles are incorporated in sufficient quantity and distribution, by volume, so as to be electromagnetically detectable.

To incorporate magnetically permeable particles into the lap sealant and/or adhesive, the particles are added in the desired quantity prior to curing. This may replace some of the filler. Alternately, the particles 17 may be painted onto the membrane sheets 16 in solvent form at regularly spaced intervals as shown in FIG. 1, or in a predetermined pattern.

When the magnetic particles are incorporated into a thermosetting sealant or adhesive, they are preferably of a size and weight effective to provide a uniform, stable dispersion of the particles in the sealant or adhesives. When the sealant has a viscosity of 1.1–1.3 million centapoise, 350 mesh particles having a specific gravity of 4.75±0.25 remain suspended. For the adhesive, which has a viscosity that is lower than that of the sealant, the size and specific gravity of the particles will have to be adjusted downward in order to remain suspended. Such a suspension of electromagnetically detectable particles in an adhesive or sealant can be used in a wide range of applications. Preferably, the magnetic particles 17 should comprise approximately 5% by volume of the total volume of non-volatile solids of the adhesive or sealant. This is simply mixed into the lap sealant and/or adhesive. The magnetic particles may be added during any stage of the mixing process, either while the non-volatile solids are mixed, for example in a Banbury mixer or while the entire composition is mixed, for example in a Sigma Blade mixer.

For magnetic particles of this type, particle sizes are generally given in terms of their maximum dimensions. Thus for example, the maximum dimension is the diameter if the particle is a sphere, but if the particle is acicular, the maximum dimension would be along its longer or longitudinal axis.

Because some of the lap sealant 19 and all of the adhesive 22 resides beneath one layer of a membrane sheet 16, there must be a sufficient quantity of particles loaded into the adhesive or sealant to be detectable through a layer of rubber up to 0.065" thick. A lap sealant and/or adhesive that is about 5% (by volume based on solids) magnetically permeable particles 17 is sufficient for noninvasive detection by an incremental inductance meter 30, shown generally in FIG. 2, through and beyond one layer of membrane sheet 16.

This, of course, will vary depending upon the amount of sealant or adhesive used and can be lower if thinner membrane sheets 16 are employed.

To detect the presence of magnetically permeable particles 17 therein, an electromagnetic field is directed proximate the roofing system 14. If roofing system 14 is sufficiently loaded with magnetically permeable particles 17, it will produce a measurable effect upon the proximately directed magnetic field, thus providing an indication of the origin of manufacture.

Although numerous methods are possible for detecting changes in the strength of a magnetic field caused by the proximity of magnetically permeable particles 17 within the flux path of the field, an incremental inductance meter 30 is preferred for detecting such particles 17. The incremental inductance meter 30 measures the change in inductance of a coil 28 in a first oscillating circuit with respect to the inductance of a coil 29 in a second oscillating circuit. Oscillating circuits of this type are sometimes referred to as tank circuits, and have a capacitor in parallel relationship with an inductor, or coil.

The operative components of incremental inductance meter 30 are diagrammatically shown in box 31. Incremental inductance meter 30 has two oscillating circuits, designated generally at 40 and 41 and having inductors 28 and 29, respectively. Oscillating circuit 40 has inductance, capacitance and oscillating frequency values designated as $L_1$, $C_1$ and $f_1$, respectively. Similarly, oscillating circuit 41 has inductance, capacitance and oscillating frequency values designated as $L_2$, $C_2$ and $f_2$, respectively. At resonance, the relationship between these parameters is defined by the following, general equation:

$$f = 1/(LC)^{\frac{1}{2}} \qquad (1)$$

where f—frequency of an oscillating circuit, (Hz)
L=inductance of an oscillating circuit, (Henrys) and
C=capacitance of an oscillating circuit (Farads).

The coil 28 of oscillating circuit 40 is wrapped around a portion of a ferrite core toroid 32 having a gap 33. Preferably, toroid 32 has a diameter of about 1.27 cm, and gap 33 is about 1—2 mm thick, although these dimensions are not critical to the invention. An oscillating current in coil 28 of circuit 40 produces an oscillating magnetic field through toroid 32. A metallic conductor 34 of low magnetic permeability is placed in gap 33, and held in place by epoxy (not shown). This forces a magnetic flux path, designated generally by lines 38, to elongate radially around metallic conductor 34 out of what would otherwise be a circular path defined generally by the shape of toroid 32.

The coil 29 of oscillating circuit 41 is an air core coil physically and electrically insulated from electromagnetic fields. Thus the current oscillates at a constant frequency according to equation 1.

Initially, with power applied to circuits 40 and 41, and no magnetically permeable material located within flux path 38, each circuit will oscillate at a resonant frequency determined by the nominal inductance and capacitance ratings of the respective circuit components, according to equation 1. Magnetic flux through toroid 32 likewise oscillates at frequency $f_1$. When magnetically permeable material resides within the magnetic flux path 38, as will eventually occur at some point in time as the incremental inductance meter 30 is moved across the roof, magnetic flux through toroid 32 will increase by a value proportional to the magnetic permeability of the material (and dependent upon the geometry). With regard to oscillating circuit 40, because the coil is wrapped around toroid 32, magnetic flux through toroid 32 is equivalent to magnetic flux through the coil 28, designated as $T_m$. An increase in the amplitude of the magnetic flux through toroid 32 with respect to the current in the coil will increase the inductive reactance of circuit 40 according to the following general equation:

$$L = N dT_m / dI \qquad (2)$$

where
L=inductive reactance of the coil,
N=number of turns of the coil
$T_m$=magnetic flux through the coil, and
I=electrical current in the coil.

Thus, an increase in the amplitude of $T_m$ with respect to I, caused by magnetically permeable material within flux path 38, results in an increase in inductive reactance $L_1$ according to equation 2. An increase in the inductive reactance of circuit 40 will produce a corresponding decrease in $f_1$ according to equation 1.

In other words, by placing the incremental inductance meter 30 proximate the roof, the flux path 38 will penetrate roofing system 14, and the high magnetic permeability of the particles 17 incorporated in any of the components will produce a measurable increase in magnetic flux through toroid 32. The increase in magnetic flux through toroid 32 causes an increase in $L_1$, according to equation 2, and a resulting decrease in frequency $f_1$, according to equation 1. At all times frequency $f_2$ remains constant.

A signal representing the difference frequency between $f_1$ and $f_2$ can be monitored. The change in this difference frequency after the field has been directed toward the roof membrane, with respect to a reference frequency, obtained prior to such direction and indicated generally as F, enables detection of the presence of magnetically permeable particles 17 within roofing system 14. Because the magnetic flux lines 38 are radially elongated around conductor 34, an electromagnetic field can be directed through and beyond a rubber membrane sheet 16 having a thickness of 0.065" to detect the presence of electromagnetic particles on the other side thereof.

In the operation of incremental inductance meter 30, a block diagram shown in FIG. 2 indicates the electronic components or circuits which perform the described functions. All of these separate components are known. Circuit 41 oscillates at a constant frequency $f_2$, preferably about 20 MHz. When no magnetically permeable particles 17 reside within the magnetic flux lines 38 of ferrite core toroid 32, circuit 40 oscillates at a constant frequency $f_1$, preferably about 25 MHz ($2.5 \times 10^7$). Circuit components are chosen such that $f_1$ is greater than $f_2$. The frequencies $f_1$ and $f_2$ are fed into a frequency mixer 42, and thereafter into a filter 44 which produces a difference frequency ($f_1 - f_2$) as the oscillating magnetic field through toroid 32 is directed toward various portions of the roof system. The difference frequency $f_1 - f_2$, prior to direction of the field, with no test sample, is referred to as the reference frequency and designated generally as F. For the above preferred frequencies, F equals 5 MHz.

The dynamic difference frequency ($f_1 - f_2$) is fed into a phase lock loop frequency discriminator 46 which produces a dc signal, S, which is proportional to the change in $(f_1-f_2)$ with respect to F. In other words, S is proportional to $(f_1-f_2)-F$. Signal S is directed into a signal routing switch and amplifier 48, which processes and routes S according to the following equations:

CONDITION 1: if $(f_1-f_2)=F$, then $S=0$
CONDITION 2: if $(f_1-f_2)<F$, then $S<0$
CONDITION 3: if $(f_1-f_2)>F$, then $S>0$ With magnetically neutral material within flux path 38 for the preferred frequencies, $(f_1-f_2)=5$ MHz and S equals 0. Meter 52 indicates no magnitude for S, corresponding to condition 1.

Under condition 2, with $(f_1-f_2)<F$, $f_1$ has decreased due to an increase in magnetic flux through toroid 32 resulting from the presence of magnetically permeable particles 17 within flux lines 38. Thus $S<0$, energizing an indicating light 54 and an audible alarm 55 to indicate the presence of magnetic particles 17.

Under condition 3, with $(f_1-f_2)>F$, $f_1$ has increased due to a decrease in magnetic flux resulting from the presence of magnetically non-permeable metal within flux lines 38. This situation occurs when roof deck 10 is formed from sheet metal or some other metallic conductor residing beneath roofing system 14. The metal presence affects incremental inductance meter 30 in a manner exactly opposite that of particles 17. Thus, with $S>0$, indicating light 57 will be energized to indicate the presence of a metallic conductor within flux lines 38. When both types of material reside within flux lines 38, the material closest to the incremental inductance meter will produce the dominant effect.

Thus, an operator using incremental inductance meter 30 is able to scan the entire surface area of a roof in a noninvasive manner to detect the presence or absence of magnetic particles 17 within or beneath membrane 14. Furthermore, meter 52 provides an indication of the variations in magnitude of d.c. signal S. Such variations could result from the use of different loading densities for the different roofing components, if desired. For instance, adhesive 22 may be loaded with magnetic particles 17 at a lower percentage by volume than the lap sealant 19 to produce different readings on meter 52. A roofing inspector could then not only detect but also distinguish between any lap sealant 19 and adhesive 22 residing beneath membrane 14 or between the adhesive 22 in the lap seam and the adhesive (not shown) used to adhere the membrane to the roof deck.

Incremental inductance meter 30 is preferably battery powered with recharging capabilities and preferably providing a potential difference of 24 volts. Box 31 may be mounted on an elongated rod to enable convenient carrying of the incremental inductance meter during monitoring of the roof.

Alternatively, the presence or absence of magnetic particles 17 within roofing system 14 can be detected by monitoring the Q factor of an oscillating circuit. The Q factor of an LC circuit is a ratio of the coil reactance at resonance to the value of the resistance in the circuit. The Q factor also provides an indication of peak energy storage divided by energy lost per cycle. Because inductance is affected by a change in magnetic flux, measuring the peak energy storage in an LC circuit divided by the constant resistance can provide an indication of the presence or absence of magnetically permeable material within the flux path generated by the inductor.

Moreover, because different magnetic particles absorb a maximum of magnetic energy at different frequencies, a frequency sweeping apparatus can be employed to measure the frequency at which peak absorption occurs. By incorporating a first portion of magnetic particles into one of the components, and a second portion of magnetic particles into another one of the components, the first and second portions differing in distribution, size and/or type, the loss can be maximized at a particular frequency, thus allowing an inspector to distinguish between differently loaded roofing components by using a frequency sweep apparatus and monitoring peak absorption frequencies. Manganese zinc or nickel zinc ferrites are particularly advantageous in this application.

In another embodiment of the invention, barium ferrite particles may be incorporated into the roof components to enable detection thereof by the monitoring of induced electromotive force in a conductor as it "cuts" or moves through the magnetic field, according to Lenz' law. In magnetic terms, barium ferrite exhibits relatively "hard" or permanent magnetic properties. Once incorporated into a roofing component, barium ferrite particles will substantially maintain their most recent magnetic orientation. If a conductor, or preferably a pick up circuit similar to that utilized by the head of a tape recording machine during the playback mode, is moved laterally over the roof to cut the magnetic field lines, any detected change in magnetic flux during the lateral movement will induce a voltage difference in the conductor.

If incorporated into the adhesive or lap sealant, or painted in a solvent upon the membrane sheets, the barium ferrite particles are preferably about 20–50 mesh, and are widely dispersed into the respective component, at about 1–2% by volume. The particles can also be painted onto the sheets in solvent foam, or deposited as a bar code. For this embodiment of the invention, the circuit of FIG. 2 is altered by replacing oscillator 40 with an amplifier which is connected, in succession, to a frequency discriminator, an amplifier and eventually the signal routing switch and amplifier. The conductor 34 is preferably removed.

As a further alternative, parallel conductors can be placed parallel to the roof. When a d.c. voltage drop is connected to the ends of the conductors, either of similar or opposite polarity, a resultant force at the wire develops according to the following equation:

$$F = (i \times B) \times 1 \; 1$$

where
 F = resultant force at the wire
 i = d.c. current flowing through the wire
 l = distance between the two wires
 B = magnetic flux produced by the d.c. current
in the opposite wire. Prior to placement of the conductors parallel with the roof, all these values are known. However, when placed parallel and adjacent the roof, magnetic flux will increase due to the presence of magnetically permeable particles within the flux path, thereby causing a detectable increase in the resultant force at the wire.

While the above description constitutes a preferred embodiment of the noninvasively identifiable roof system and the method for noninvasively identifying the roof system of this invention, it is to be understood that the invention is not limited thereby and that in light of the present disclosure of the invention, various other alternative embodiments will be apparent to a person skilled in the art. Accordingly, it is to be understood that changes may be made without departing from the scope of the invention as particularly set out and claimed.

We claim:

1. A noninvasively identifiable roof system comprising:
   a plurality of water impermeable membrane sheets sealed at overlapping edges thereof by lap sealant and adhesive to form one continuous water impervious membrane;
   magnetically permeable particles incorporated into at least one component part of said roof system selected from the group consisting of said adhesive, said lap sealant and said membrane sheets, said particles incorporated in sufficient quantity and distribution so as to be electromagnetically detectable.

2. A noninvasively identifiable roof system as in claim 1 wherein said magnetically permeable particles are applied onto said membrane sheets at regularly spaced intervals.

3. A noninvasively identifiable roof system as in claim 1 wherein said magnetically permeable particles are incorporated into at least two of said roofing components, a first quantity of magnetic particles incorporated into one of said roof components and a second quantity of particles incorporated into a second component, said first and second quantities being different to render said incorporated roof components noninvasively distinguishable.

4. A noninvasively identifiable roof system as in claim 3 wherein said adhesive and said lap sealant are loaded with different quantities of said magnetically permeable particles so as to be noninvasively distinguishable.

5. A noninvasively identifiable roof system as in claim 1 wherein said particles are incorporated in sufficient quantity and distribution into at least one of said component parts so as to produce a detectable effect on magnetic flux when a magnetic field is directed proximate said component parts.

6. A noninvasively identifiable roof system as in claim 5 wherein said magnetically permeable particles are incorporated into said adhesive.

7. A noninvasively identifiable roof system as in claim 6 wherein said particles are incorporated into said adhesive at about 5% by volume of the total volume of non-volatile solids therein.

8. A noninvasively identifiable roof system as in claim 6 wherein said particles have a size of up to 350 mesh.

9. A noninvasively identifiable roof system as in claim 6 wherein said particles are nickel zinc ferrite.

10. A roof system as in claim 2 wherein said magnetically permeable particles are incorporated into said lap sealant.

11. A noninvasively identifiable roof system as in claim 10 wherein said particles are incorporated into said sealant at about 5%, by volume of the total volume of non-volatile solids therein.

12. A noninvasively identifiable roof system as in claim 10 wherein said particles have a size of up to 350 mesh.

13. A noninvasively identifiable roof system as in claim 10 wherein said particles are nickel zinc ferrite.

14. A method of forming a roof system in which the origin of manufacture of component parts thereof is noninvasively detectable, comprising the step of:
   incorporating magnetically permeable particles into one component part selected from the group consisting of said adhesive, said lap sealant and said membrane sheets, said particles incorporated in sufficient quantity and distribution so as to be electromagnetically detectable.

15. The method as in claim 14 wherein said magnetically permeable particles are incorporated into one of said component parts selected from the group consisting of said lap sealant and said adhesive, said particles approximating about 5%, by volume of the total volume of non-volatile solids therein.

16. A method as in claim 15 wherein said incorporated particles are nickel zinc ferrite.

17. A method of forming a roof system in which the origin of manufacture of component parts thereof is noninvasively detectable, comprising the step of:
   sealing a plurality of water impermeable membrane sheets at overlapping edges thereof by lap sealant and adhesive to form one continuous water impervious membrane to cover said roof deck, at least one of said lap sealant and said adhesive having magnetically permeable particles incorporated therein in sufficient number and distribution so as to be electromagnetically detectable.

* * * * *